Aug. 7, 1962   G. C. HOLMES   3,048,353
MEANS OF FLIGHT CONTROL OF A HELICOPTER
Filed July 12, 1957

INVENTOR.
GENE C. HOLMES
BY Lyon & Lyon
ATTORNEYS

United States Patent Office 3,048,353
Patented Aug. 7, 1962

3,048,353
MEANS OF FLIGHT CONTROL OF A HELICOPTER
Gene C. Holmes, 5708 Briarcliff Road, Los Angeles, Calif.
Filed July 12, 1957, Ser. No. 671,630
5 Claims. (Cl. 244—23)

This invention relates to an improvement in aircraft capable of vertical ascent and descent.

It is an object of this invention to provide improved means for controlling flight of such an aircraft during takeoff, hovering while in flight or during landings normal or forced.

It is a further object of this invention to increase the vertical lift of such craft, particularly during takeoff or landing.

It is another object of this invention to make the rudder effective at all times particularly during hovering to provide directional control.

It is still a further object of this invention to provide novel means for controlling the direction of flight at all times without changing the attitude of the craft.

Still a further object of this invention is to provide means effective at all times for correcting the attitude of the craft.

Still a further object of this invention is to provide during a forced landing an emergency driving mechanism providing directional control without change of attitude, thereby increasing the safety of such an aircraft.

Other objects and advantages will be readily apparent from the following description:

Figure 1:
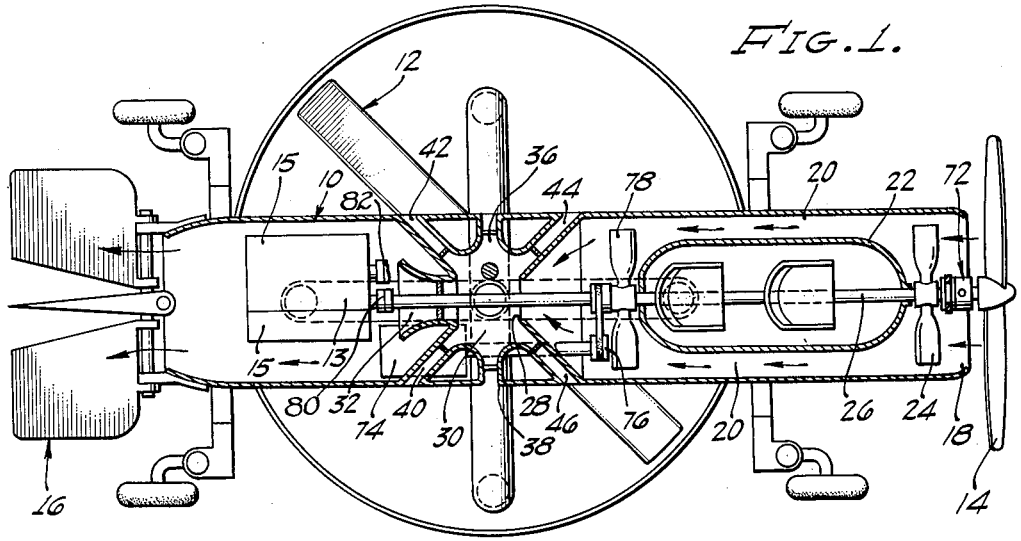
FIGURE 1 is a top plan view with parts broken away of a helicopter embodying this invention.

A helicopter 10 has a pair of counter-rotating rotors 12, driven by engine 13, a front propeller 14, driven by engine 15, and a rudder assembly 16 which may be conventional in construction except that a portion of the fuselage is hollow permitting flow of air therethrough. The present invention is concerned with the creation and control of air flow through the fuselage and the results obtained therefrom. In this embodiment the front of the fuselage is open as at 18, and an air passage such as 20 is formed on either side of the cockpit 22. A suitable impeller 24 is mounted upon the same shaft 26 as propeller 14 and rotates therewith drawing air into passage 20.

Figure 5:
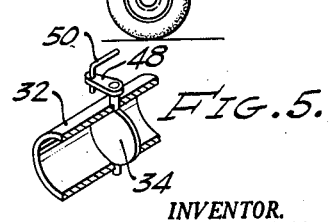
FIGURE 5 is a fragmentary perspective of an air discharge control valve.

To the rear of the cockpit the air passage is reduced in area forming a discharge 28 into an upper distribution chamber 30. A plurality of discharge passages join in chamber 30. The rearmost discharge passage 32 is axially aligned with the center line of the craft and a valve 34 is provided therein to shut off flow therethrough. Two discharge passages 36 and 38 are provided normal to the center line of the aircraft while additional discharge passages 40, 42, 44 and 46 are positioned midway between the center line of the aircraft and normal thereto. Each discharge passage is provided with a valve similar to 34 illustrated in FIG. 5, which is rotated by crank 48 in turn positioned by rod 50 which is operated from a suitable control station. Thus as the aircraft is flying air is discharged through one of the air passages with the remainder closed giving a resultant force in the opposite direction moving the helicopter without changing its attitude. Also a combination of passages may be opened such as 44 and 46 to give a rearward movement to the helicopter without changing its attitude or passages 42 and 44 or 40 and 46 to give a sideways movement thereto. Thus air through passages 36 or 38 provides sideways movement. Air moving through passage 32 renders the rudder effective at all times particularly when hovering.

During vertical movement of the craft it is desirable to close all the air passages 32, 36, 38, 40, 42, 44 and 46 so that air will be directed into the lower air chamber 51. This chamber has multiple outlets as does chamber 30. One such outlet 52 is directly in line with duct 54 communicating chambers 30 and 51 and is directed straight down. To the rear of discharge 52 and on the center line of the aircraft is a second discharge 56 also directed downwardly while a similar discharge 58 lies along the center line of the aircraft and forward of discharge 52.

Figure 2:
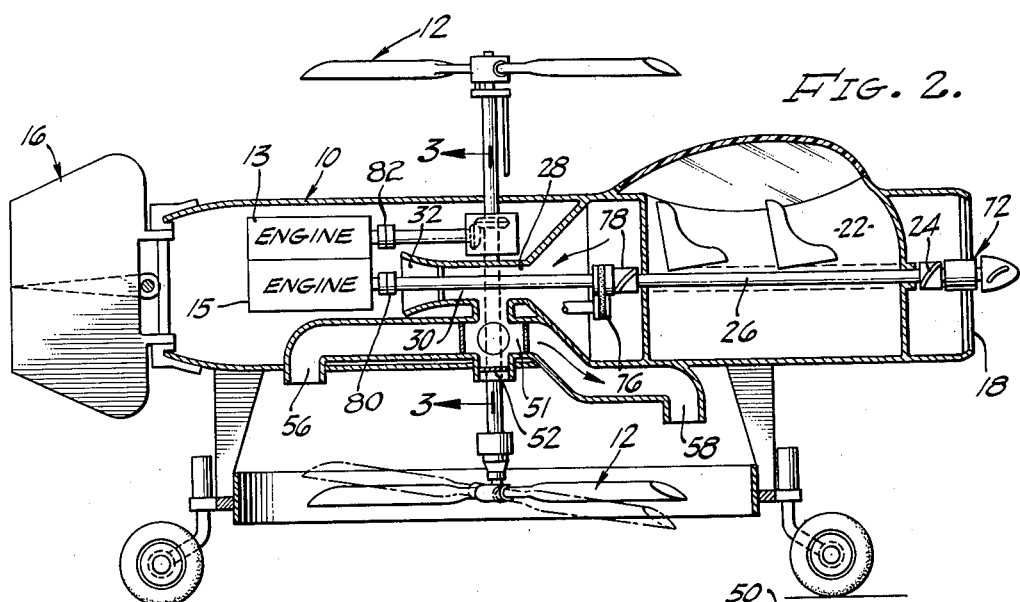
FIGURE 2 is a side elevation with parts broken away.
Figure 3:
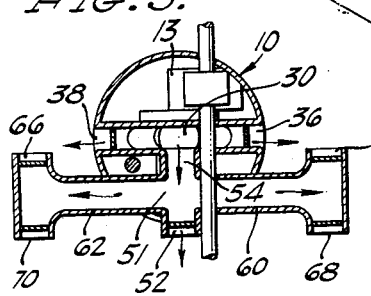
FIGURE 3 is a view taken along line 3—3 of FIGURE 2.
Figure 4:
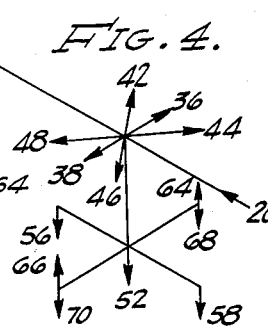
FIGURE 4 is a vector diagram illustrating alternative air discharge routes.

A pair of ducts 60 and 62 communicate with chamber 51 and project normal to the center line of the aircraft. Each duct has an upwardly faced discharge 64 or 66 and a downwardly facing discharge 68 or 70. Each discharge 52, 56, 58, 64, 66, 68 and 70 has a valve similar to 34 therein so that same may be opened or closed as desired. A discharge through 52 will increase lift on takeoff and create an air cushion beneath the aircraft when landing while discharge through 56, 58, 64, 66, 68 and 70 is used to correct the attitude of the craft at all times in flight or hovering as well as during ascent or descent, for example, discharge through 56 will tend to rotate the craft counterclockwise as viewed from the right in FIG. 2, with a similar result upon discharge through the other outlets. Thus it is apparent that the flow of air through the craft may be diverted to a desired direction to create an equal and opposite reaction utilized to control direction of flight and/or correct the attitude of the craft.

In the event of engine failure with the rotors 12 free wheeling and in the negative position and propeller 14 dead a clutch 72 may be disengaged to permit free wheeling of the propeller. An auxiliary engine 74 may then be run for example by a battery which through clutch 76 turns shaft 26 upon which impeller 24 and booster impeller 78 are mounted to continue forcing air through the craft to permit attitude and directional control during descent. A further clutch 80 disconnects engine 15 from shaft 26 and clutch 82 disconnects rotors 12 under these circumstances. Air through passage 52 will cushion the landing.

While what hereinbefore has been described as the preferred embodiment of this invention, it is readily apparent that alterations and modifications can be resorted to without departing from the scope of this invention and such alterations and modifications are intended to be included within the scope of the appended claims.

I claim:

1. A device for flight control of a vertically ascending and descending aircraft comprising: an air passage through said aircraft, means for forcing air through said passage, discharge means for discharging air from said passage, rudder means on said aircraft in the path of air issuing from said discharge means, additional discharge means fixed on said aircraft, communicating with said passage, and being angularly disposed with respect to said first mentioned discharge means, and valves for selectively controlling air flow through said discharge means, said additional discharge means being laterally directed to direct air in a fixed horizontal direction to thereby displace said aircraft without tilting the same.

2. A device as defined in claim 1 wherein said air passage extends along the centerline of said aircraft, said additional discharge means being arranged to direct air laterally normal to said centerline.

3. A device as defined in claim 1 wherein said air passage extends along the longitudinal centerline of said aircraft, said additional discharge means being arranged to direct air laterally oblique to said centerline.

4. A device as defined in claim 1 wherein said air passage extends along the longitudinal centerline of said aircraft and including further valve-controlled discharge means communicating with said passage and arranged to direct air downwardly of said aircraft directly below said centerline.

5. A device as defined in claim 1 wherein said air passage extends along the centerline of said aircraft and including further valve-controlled discharge means communicating with said passage and arranged to direct air in an upward direction from a position fixed relative to said aircraft and laterally offset from said centerline.

References Cited in the file of this patent

UNITED STATES PATENTS

| | | |
|---|---|---|
| 1,585,281 | Craddock | May 18, 1926 |
| 1,714,561 | Johnston | May 28, 1929 |
| 1,791,597 | Langdon | Feb. 10, 1931 |
| 1,892,949 | Holmes | Jan. 3, 1933 |
| 2,103,881 | Wagner | Dec. 28, 1937 |
| 2,162,956 | Lysholm | June 20, 1939 |
| 2,396,130 | Sbrilli | Mar. 5, 1946 |
| 2,464,724 | Sedille | Mar. 15, 1949 |
| 2,870,978 | Griffith | Jan. 27, 1959 |

FOREIGN PATENTS

| | | |
|---|---|---|
| 610,143 | Great Britain | Oct. 12, 1948 |
| 1,018,400 | France | Oct. 15, 1952 |